(12) United States Patent
Lester

(10) Patent No.: US 8,967,007 B2
(45) Date of Patent: Mar. 3, 2015

(54) CONTINUOUSLY VARIABLE TRANSMISSION USING OSCILLATING TORQUE AND TIMING BELT OR TIMING CHAIN CONSTRAINED MASSES

(76) Inventor: William Terry Lester, Fort Worth, TX (US)

( * ) Notice: Subject to any disclaimer, the term of this patent is extended or adjusted under 35 U.S.C. 154(b) by 953 days.

(21) Appl. No.: 12/430,090

(22) Filed: Apr. 26, 2009

(65) Prior Publication Data

US 2010/0269605 A1    Oct. 28, 2010

(51) Int. Cl.
| | |
|---|---|
| *F16H 27/00* | (2006.01) |
| *F16H 29/00* | (2006.01) |
| *F16H 29/08* | (2006.01) |
| *F16H 33/08* | (2006.01) |

(52) U.S. Cl.
CPC ..................................... *F16H 33/08* (2013.01)
USPC ............................................... 74/119; 74/112

(58) Field of Classification Search
CPC ......... F16H 29/04; F16H 29/08; F16H 29/16; F16H 33/02; B62M 9/08; B62M 9/04; B62M 1/28; B62M 3/04; B62M 9/085
USPC ......................................... 74/112, 119, 125.5
See application file for complete search history.

(56) References Cited

U.S. PATENT DOCUMENTS

| | | | | |
|---|---|---|---|---|
| 3,805,514 | A | * | 4/1974 | Bodine ........................... 60/698 |
| 4,907,474 | A | * | 3/1990 | Bolger ............................ 475/14 |
| 6,044,718 | A | * | 4/2000 | Lester ............................. 74/112 |
| 6,062,096 | A | * | 5/2000 | Lester ............................. 74/112 |
| 2003/0134707 | A1 | * | 7/2003 | Goldie et al. ................. 475/149 |
| 2006/0070469 | A1 | * | 4/2006 | Lester .......................... 74/125.5 |

* cited by examiner

*Primary Examiner* — Justin Krause
(74) *Attorney, Agent, or Firm* — Richard G. Eldredge

(57) ABSTRACT

A transmission utilizing oscillating torque to vary the mechanical power transmitted to a load was previously patented by this inventor (U.S. Pat. Nos. 6,062,096, 6,044,718, and 7,481,127). The transmission has a rotatable input member and a rotatable mass. The transmission also has a member with an eccentric offset, with the rotatable mass rotatably coupled to the offset and being eccentric with respect to the offset. The present invention provides several improvements to the previous patents including belt or chain for the rotating masses to improve load carrying capacity and improvements to the control system using inertia control. FIG. 1 shows the fully assembled transmission.

1 Claim, 22 Drawing Sheets

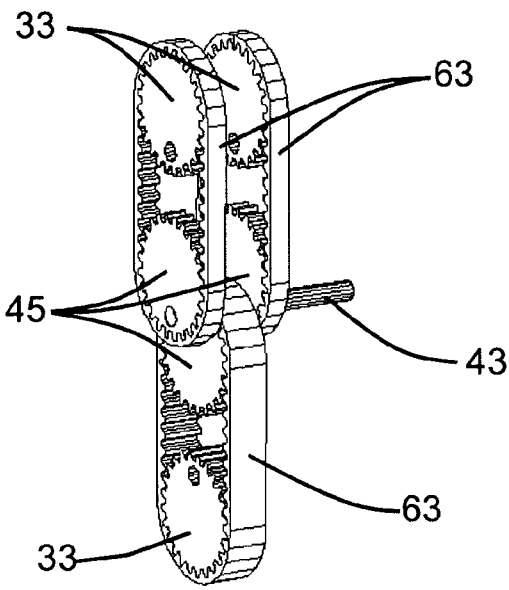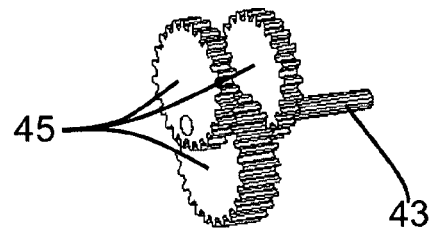
Fig. 7A  Fig. 7B
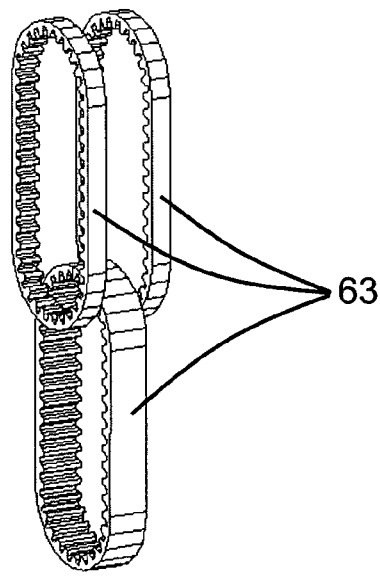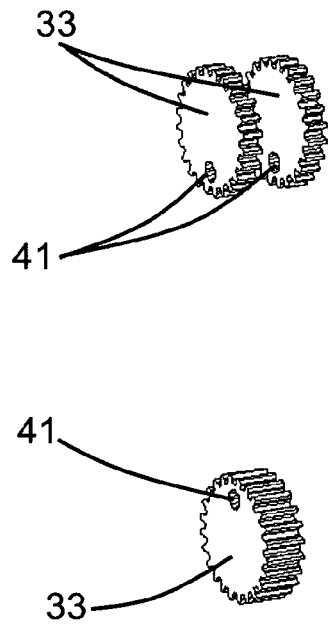
Fig. 7C  Fig. 7D

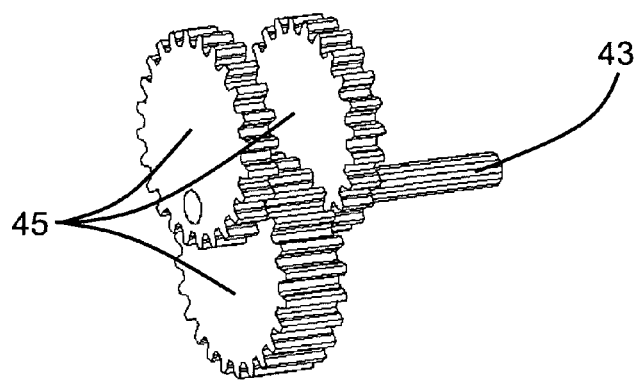
Fig. 10A
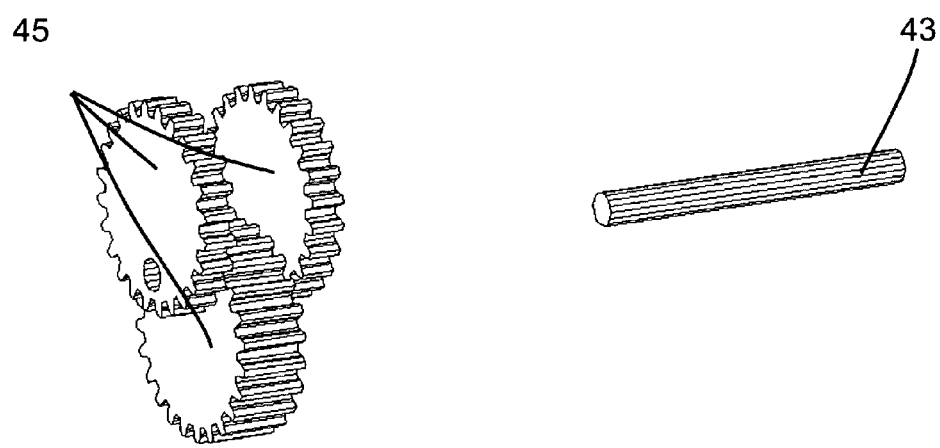
Fig. 10B
Fig. 10C

CONTINUOUSLY VARIABLE TRANSMISSION USING OSCILLATING TORQUE AND TIMING BELT OR TIMING CHAIN CONSTRAINED MASSES

FIELD OF THE INVENTION

The present invention relates to transmissions of the type that are used to regulate the transmission of power from an engine or a prime mover to a load, such as are used in vehicles.

BACKGROUND OF THE INVENTION

Transmissions are used in a variety of applications to change the speed and torque provided by an engine or prime mover. One popular application of transmissions is in an automobile. In an automobile, the transmission is connected between the engine and the drive wheels or tires.

Prior art automobiles utilize fixed ratio transmissions. These transmissions have a set of gears that provide a few fixed and discrete speed ratios between the input from the engine and the output to the tires. Engine rpm (revolutions per minute) varies over a wide range for each speed ratio. Because the engine must operate over a wide range of speeds, its overall efficiency is reduced.

Continuously variable transmissions offer a way to boost engine efficiency. Unlike fixed ratio transmissions, continuously variable transmissions offer a wide range of speed ratios between the input from the engine and the output to the tires. This allows the engine to operate over a narrow range of optimum rpm's, whereby the engine efficiency can be increased. By varying the speed ratio, the engine speed can be maintained in its optimum range, even for a variety of driving conditions, thereby improving fuel efficiency.

Previous Patents by this inventor (U.S. Pat. Nos. 6,062,096, 6,044,718, and 7,481,127) disclose a continuously variable transmission that utilizes rotating eccentric masses to produce an oscillating torque. The oscillating torque is converted into one-way torque by one-way drives or clutches.

The inventions herein are refinements to the previously patented designs to provide increased load carrying capacity and alternate methods of controlling the output torque.

SUMMARY OF PRESENT INVENTION

It is an object of the present invention to improve the previously disclosed continuously variable transmission.

The transmission of the previous invention comprises a rotatable input member and a rotatable mass. There is also a member with an eccentric offset, with the rotatable mass being rotatably coupled to the offset and being eccentric with respect to the offset. The input member is coupled to the rotatable mass by a linkage so that the rotation of the input member causes the rotatable mass to rotate about the offset. First and second one-way clutches transfer torque from the offset member to the output member. The first one-way clutch drives the output member in one direction when the eccentric offset member is driven in the same direction, and the second one-way clutch prevents the output member from rotating in the opposite direction.

In accordance with one aspect of the previous invention, the rotatable mass is a first rotatable mass and the eccentric offset is a first eccentric offset. A second rotatable mass is rotatably coupled to a second eccentric offset on the eccentric offset member, with the first and second eccentric offsets being opposite of one another with respect to a rotational axis of the eccentric offset member. The input member is coupled to the second rotatable mass by a second linkage so that rotation of the input member causes the second rotatable mass to rotate.

In accordance with another aspect of the previous invention, the linkage comprises a four bar linkage.

In accordance with another aspect of the previous invention, the four bar linkage comprises a transverse member coupled to an input shaft, a link between the transverse member and the mass, a first arm between the mass and the eccentric offset, and a second arm extending between the eccentric offset and an axis of rotation of the eccentric offset member.

In accordance with another aspect of the previous invention, the member with the eccentric offset comprises a crankshaft.

In accordance with another aspect of the previous invention, the input member comprises a yoke.

The previous invention also provides a method of transmitting mechanical power from a source to a load. A rotational input is received from the source. The rotational input is used to rotate an eccentric first mass about a first offset and to rotate a second eccentric mass about a second offset, thereby producing a torque on a shaft incorporating the first and second offset. The rotation of the first and second masses carry the load through linkages from the input to the first and second masses. The shaft is allowed to rotate in a first direction, but the rotation of the shaft is prevented in the opposite direction. The torque acting on the shaft in the first direction is provided to the load.

Improvements to IVT

Three improvements are incorporated to optimize the overall performance of the continuously variable transmission.

The first improvement relates to the method of transferring the torque from the engine to drive the rotatable masses. In this configuration timing belts or timing chains are used to carry the centrifugal load from the rotatable masses. The timing belts or timing chains maintain the same rotational orientation between the sprockets of the rotatable masses and the sprockets that are fixed to the arm assembly. The linkage connecting the drive yoke to the rotatable masses transfers the torque to the rotatable masses. For clarification, the sprockets that are not fixed to the arm assembly act as rotatable masses. The offset of the sprockets is the distance of the two moment arms of the arm assembly. The distance of the moment arm is the length from the center of the sprocket to the axis of rotation of the arm assembly.

The second improvement is the use of elliptical sprockets. The elliptical sprockets replace the round sprockets in this configuration. The elliptical sprockets are used to reduce the mass moment of inertia of both the rotatable masses and the arm assembly. The elliptical sprockets have a smaller mass moment of inertia than circular sprockets. The smaller combined mass moment of inertia of the rotatable masses and the arm assembly increase the power capacity of the transmission.

Mass moment of inertia is the measure of an object's resistance to change in its rotation rate. A larger mass moment of inertia will produce a smaller angular acceleration about that axis for a given torque.

The third improvement is the addition of the inertia control system which controls the magnitude of the power transmitted. This is accomplished through varying the mass moment of inertia of the arm assembly.

The inertia control improvement is any device which changes the mass moment of inertia of the arm assembly, such as a flywheel or clutch. There are multiple methods or devices to achieve the variation of the arm assembly mass moment of inertia.

One such method for controlling the mass moment of inertia of the arm assembly is to add a controllable mass to the arm assembly such as with a flywheel.

Another method for controlling the mass moment of inertia of the arm assembly is to add clutches to the arm assembly.

Yet another method for controlling the mass moment of inertia is to include a phase change fluid such as a magnetorheological (MR) fluid controlled by a fixed or variable magnetic field.

Another method for controlling the mass moment of inertia is to include an electrorheological (ER) phase change fluid to control the effective mass moment of inertia using a fixed or variable electrical field.

BRIEF DESCRIPTION OF THE DRAWINGS

FIGS. 7A-7D show various cutaway views of the rotating masses (sprockets) and belts.

FIGS. 10A, 10B, and 10C are various views of the arm assembly showing the offset of the central sprockets used to hold the belts and masses. The offset of the sprockets creates the moment arm.

DESCRIPTION OF THE PREFERRED EMBODIMENT

Figure 1:
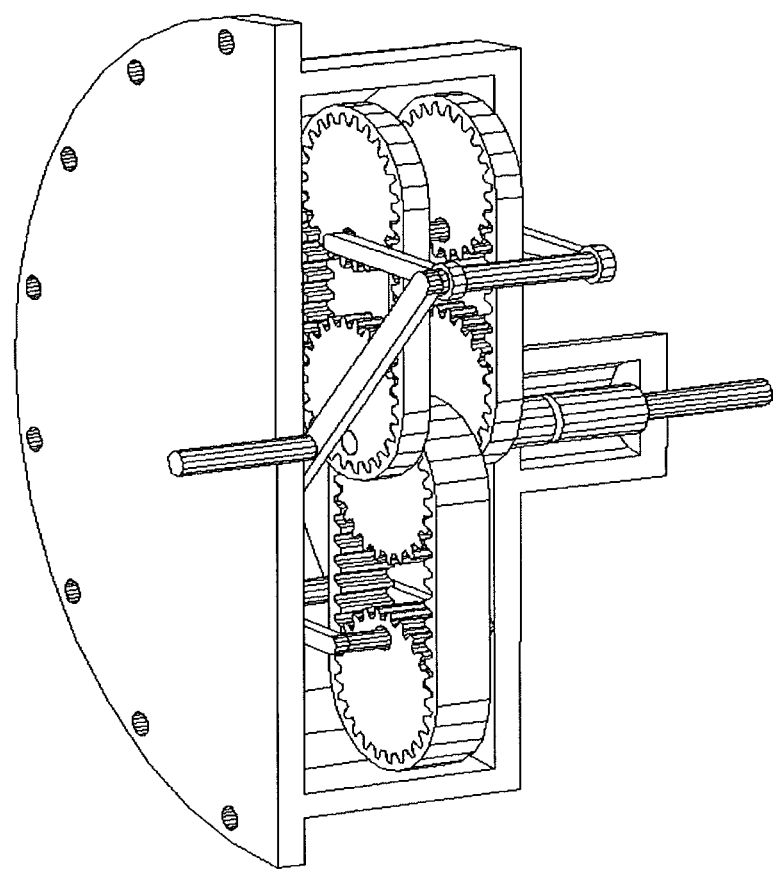
FIG. 1 shows the fully assembled transmission.
Figure 2:
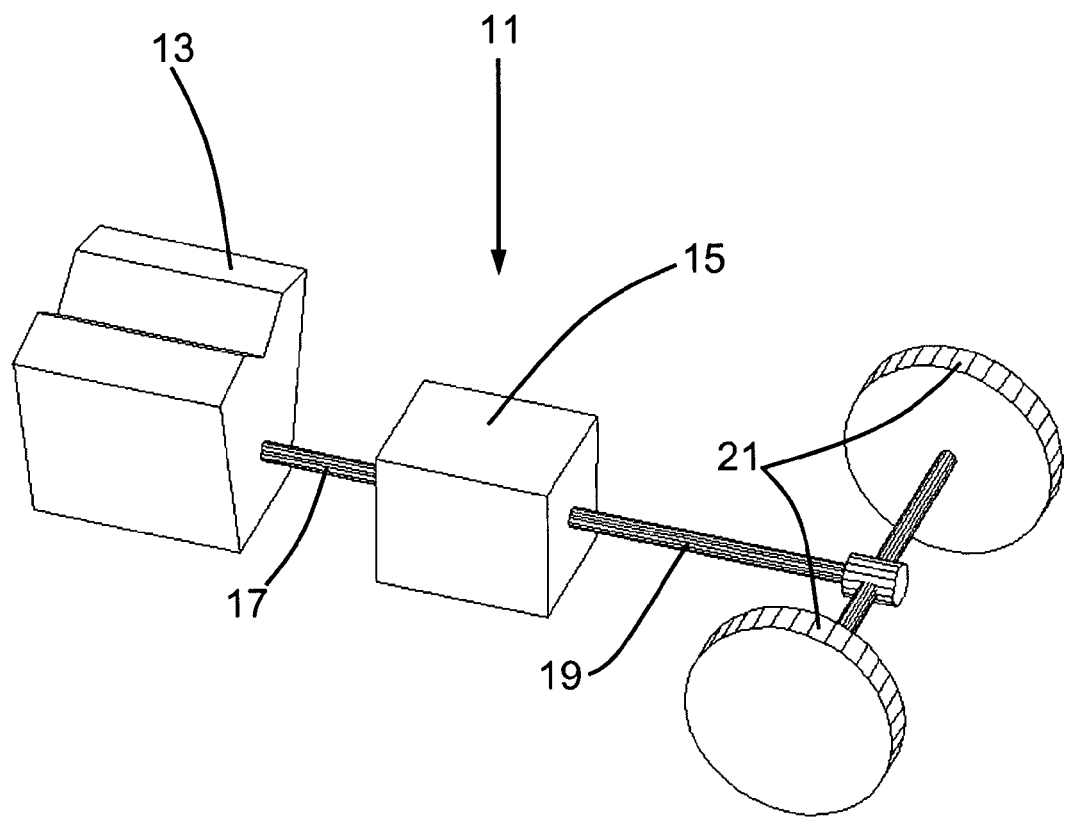
FIG. 2 is a schematic view of a vehicle drivetrain, showing the transmission of the present invention.

In FIG. 2, a schematic diagram of a vehicle power system 11 is given. The system has a prime mover 13, a transmission 15, and an output load 21.

The prime mover 13 is typically an internal combustion engine that can be powered by gasoline, diesel, natural gas, etc. Alternatively, the prime mover 13 can be electric motors or some other source of power.

The transmission 15 is that of the previous invention, shown in accordance with a preferred embodiment. The transmission 15 has an input 17 that is connected to the prime mover 13 and an output 19 that is connected to the load 21. The load 21 is shown as being a drive shaft and vehicle wheels.

The transmission 15 is of a continuously variable type. Many internal combustion engines (and electric motors) operate more efficiently within a narrow range of engine speeds. A continuously variable transmission can be provided with a narrow range of input speeds and produce a wide range of output speeds for the load. Unlike prior art gear transmissions, where each output speed has a specific gear, a continuously variable transmission provides a continuous output of speeds. This allows the engine to operate within a narrow, and thus more efficient, range of speeds.

Figure 3:
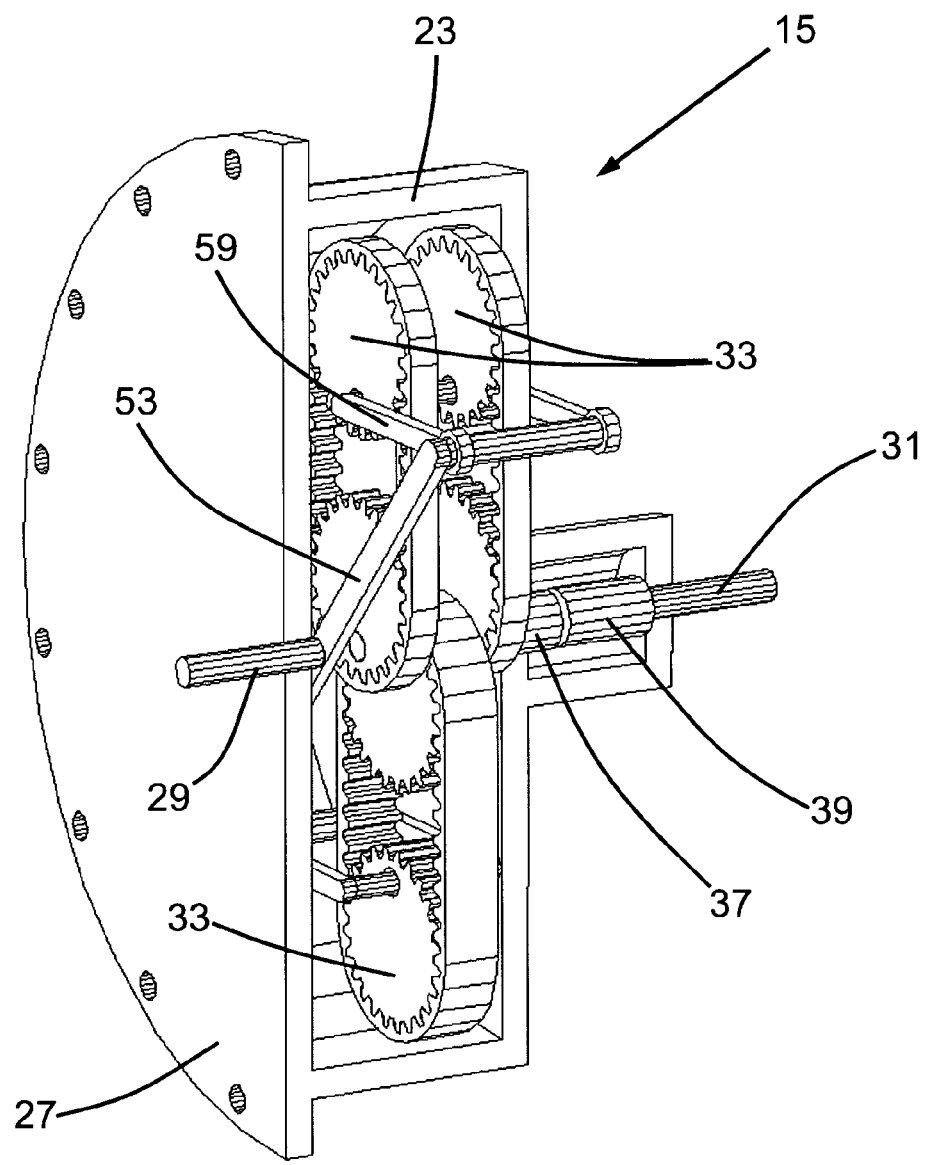
FIG. 3 is a cutaway of the assembled transmission.
Figure 4:
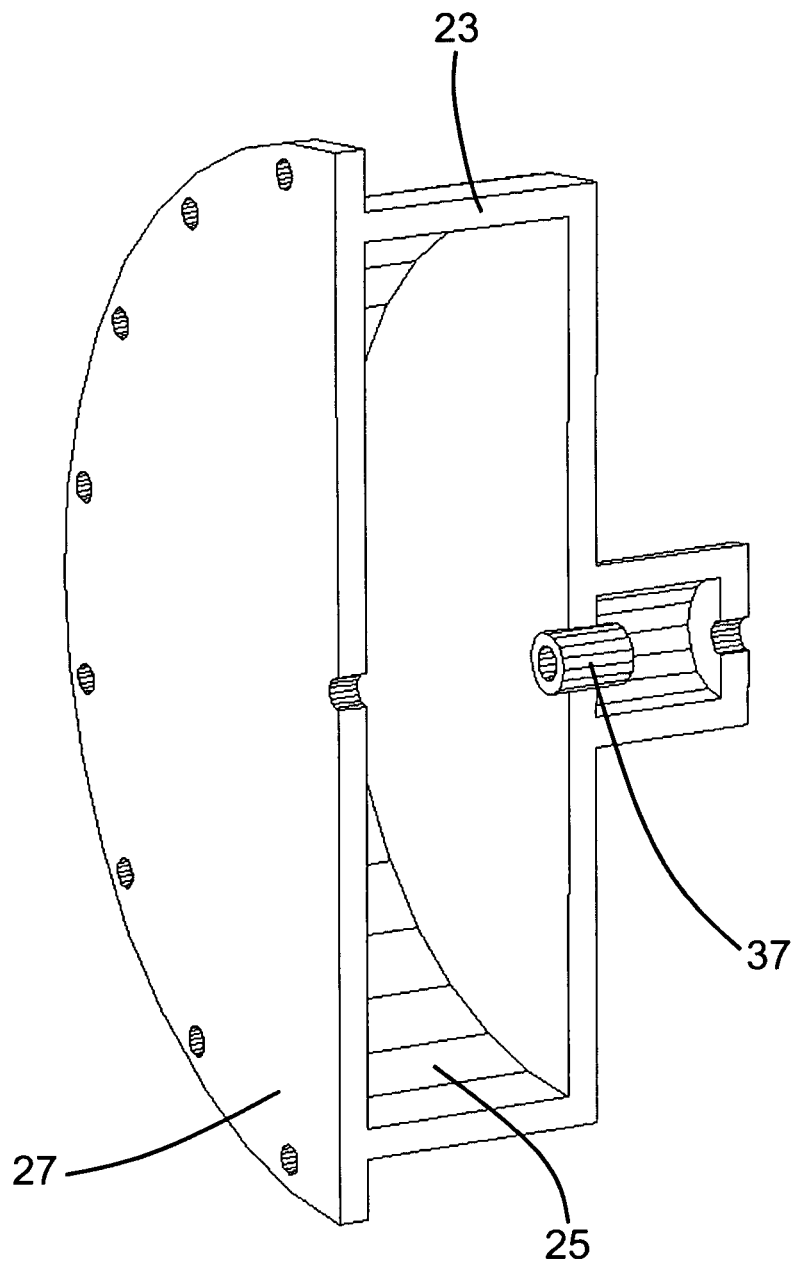
FIG. 4 is a cutaway showing the casing and the first clutch to the frame.
Figure 5:
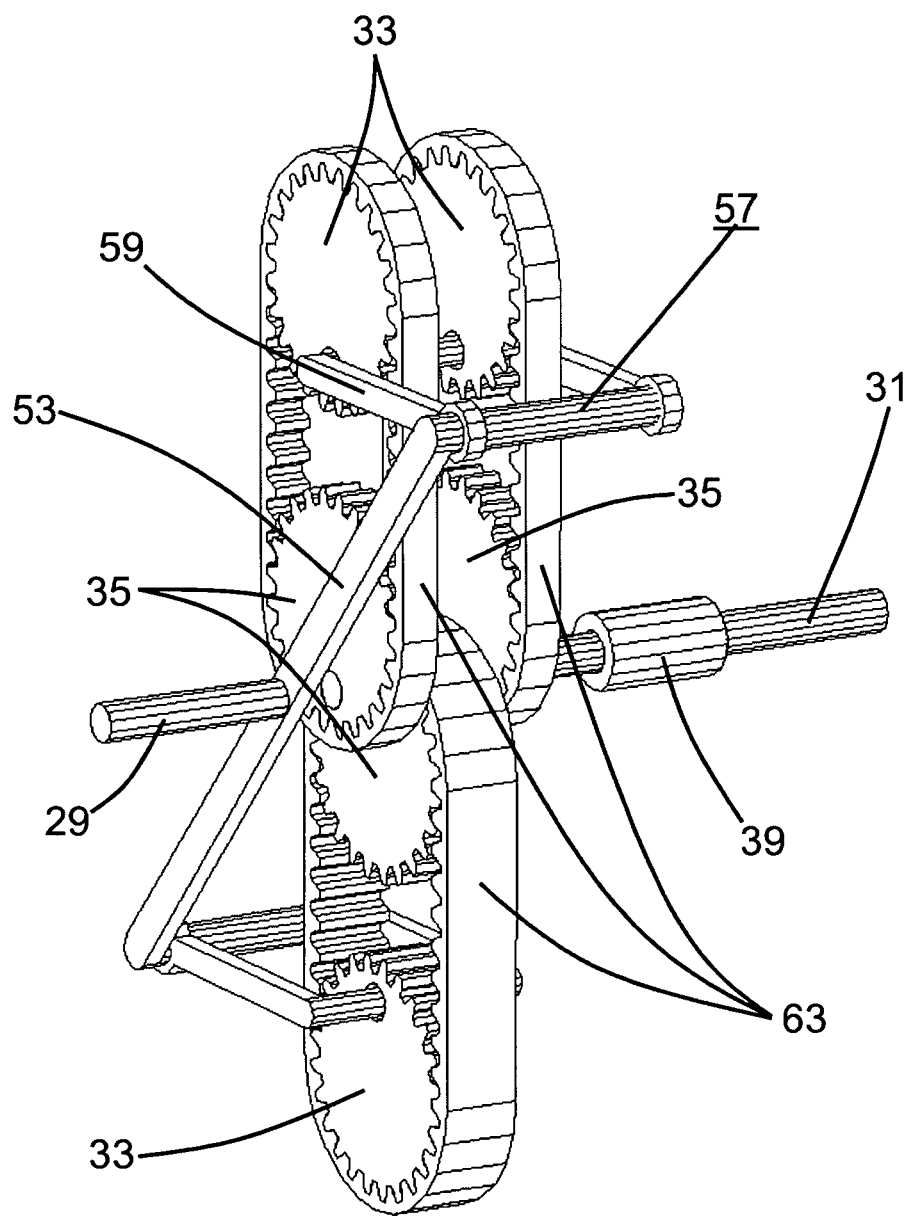
FIG. 5 shows the casing removed with the rotating masses, arm assembly, output assembly, and drive yoke shown.
Figure 6:
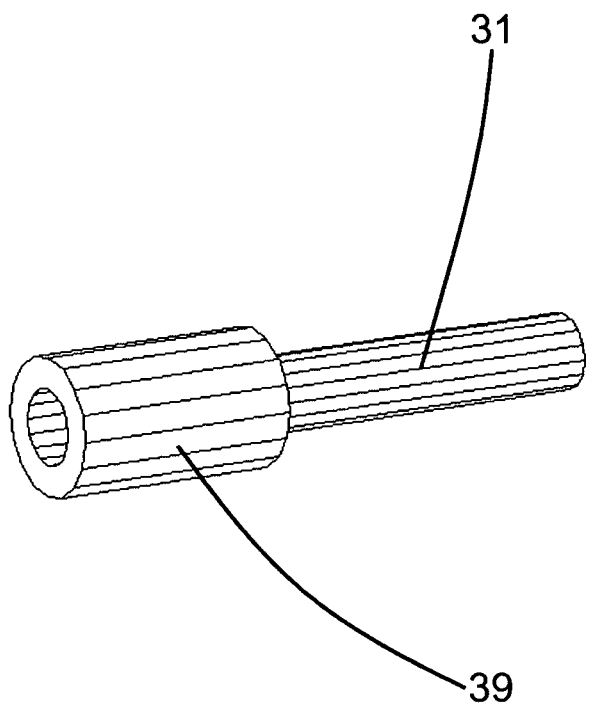
FIG. 6 depicts the output shaft and output one-way clutch
Figure 8A:
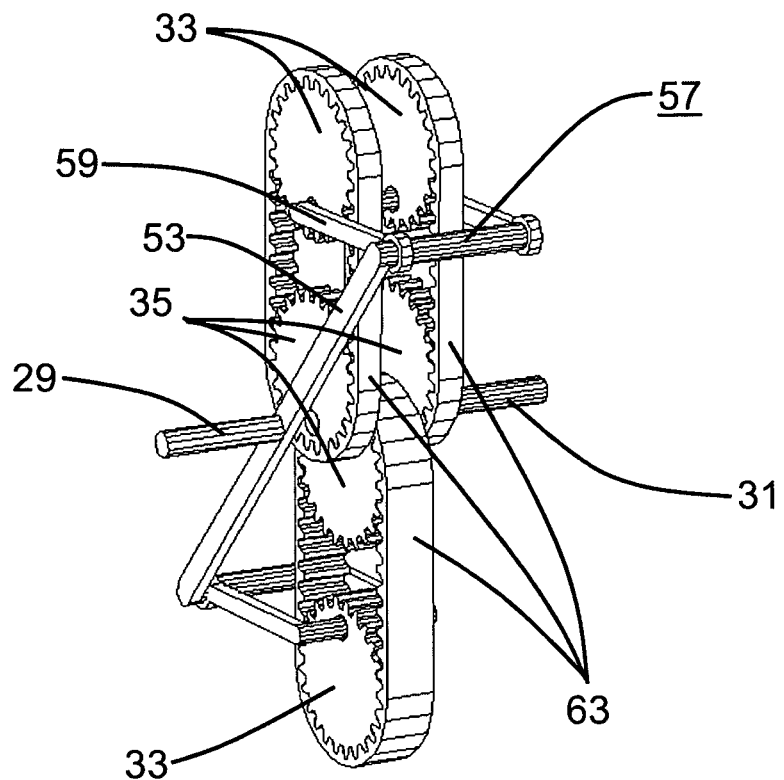
FIG. 8A shows the new material for one of the major improvements in this invention, namely the rotating masses with belts.
Figure 8B:
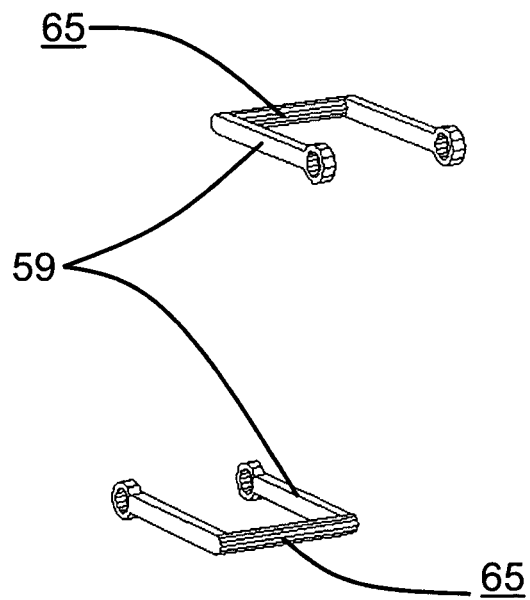
FIG. 8B illustrates the drive links
Figure 9A:
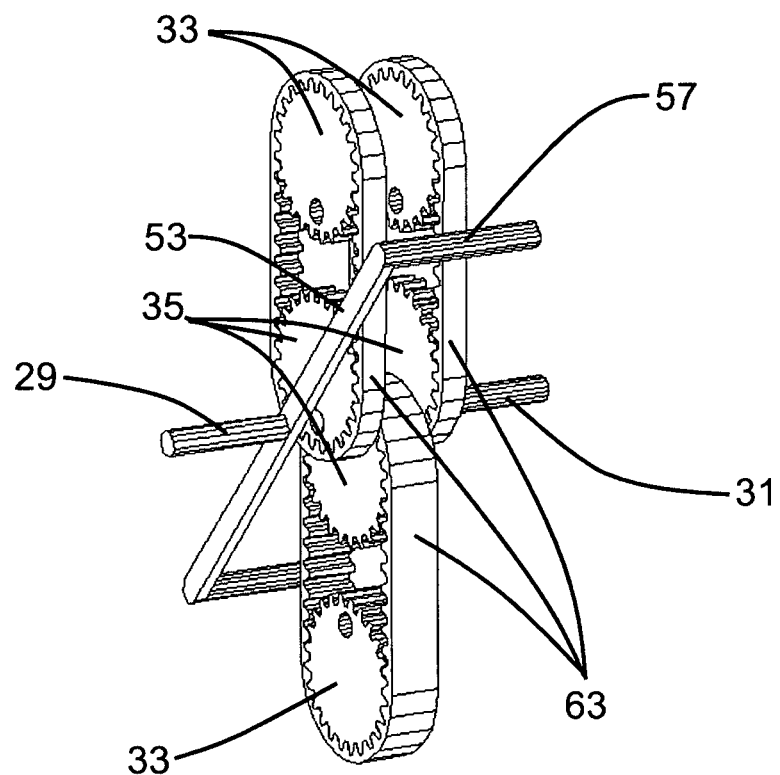
FIG. 9 shows the rotating masses with drive links removed.
FIG. 9B shows the drive yoke.
Figure 9B:
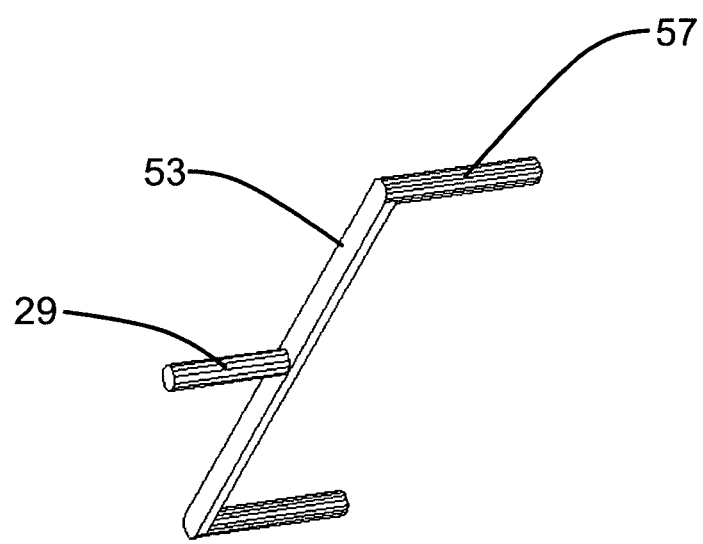
Figure 11:
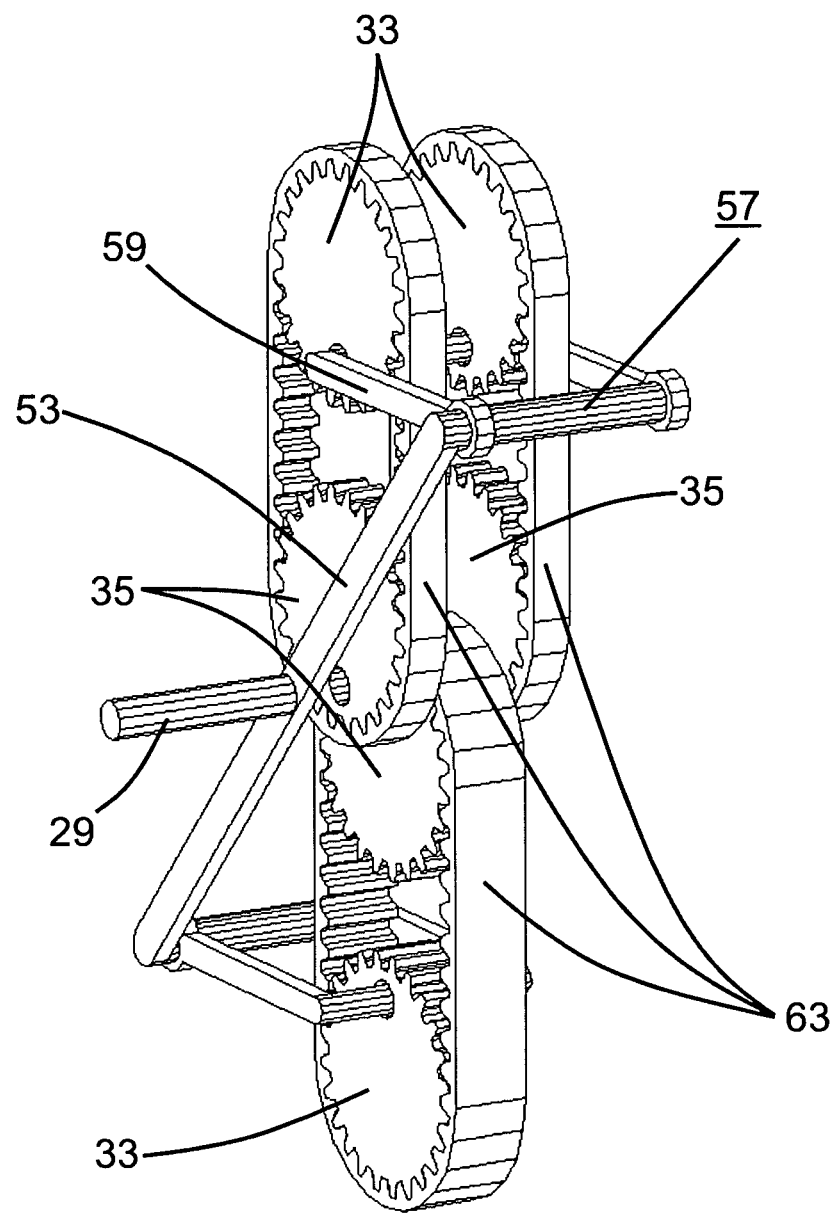
FIG. 11 shows the rotating masses and input assembly with the output assembly removed.
Figure 12A:
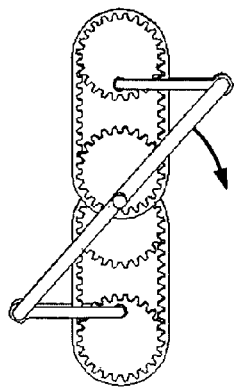
FIGS. 12A-12F show end views of the rotating masses at various angles during a single rotation to demonstrate the relationship between the masses during the rotational cycle.
Figure 12B:
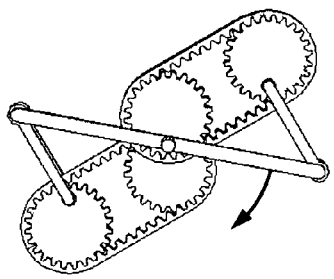
Figure 12C:
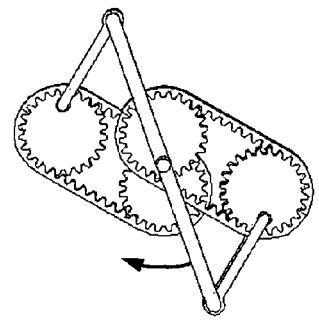
Figure 12D:
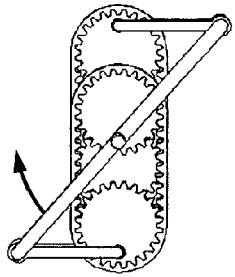
Figure 12E:
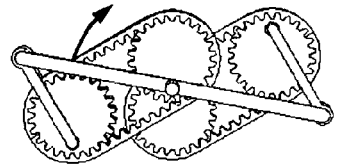
Figure 12F:
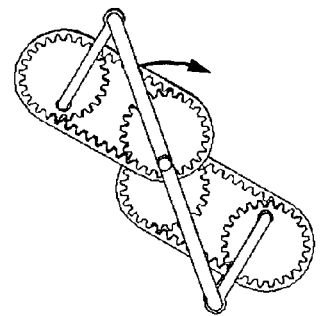

Referring to FIG. 3, the transmission 15 has a casing or enclosure 23. The casing 23 has a cavity 25 for receiving the movable components of FIG. 5. The casing 23 also has a flange 27, or other mounting structure, to secure the casing 23 to a chassis, frame, etc. of the vehicle [see FIG. 4].

The transmission 15 has an input shaft 29 and an output shaft 31. The input shaft 29 is coupled to rotatable masses 33 by the drive yoke 53 and drive links 59. The input shaft 29, the drive yoke 53 and dive links 29 causes the rotatable masses 33 to rotate about an eccentric crankshaft 35 in a circular path. The motion of the rotating masses 33 produces a centrifugal force. The centrifugal force is transferred to the crankshaft 35 which produces an oscillating torque and results in the bidirectional motion of the crankshaft 35. The bidirectional rotation of the crankshaft 35 is converted into unidirectional rotation by the output clutches 37, 39, which are one-way clutches. The output clutch 39 and the arm assembly shaft 43 drive the output shaft 31 in the output direction. The output clutch 37 is fixed to the casing 23 and prevents the arm assembly shaft 43 from rotating in the other direction.

Figure 13:
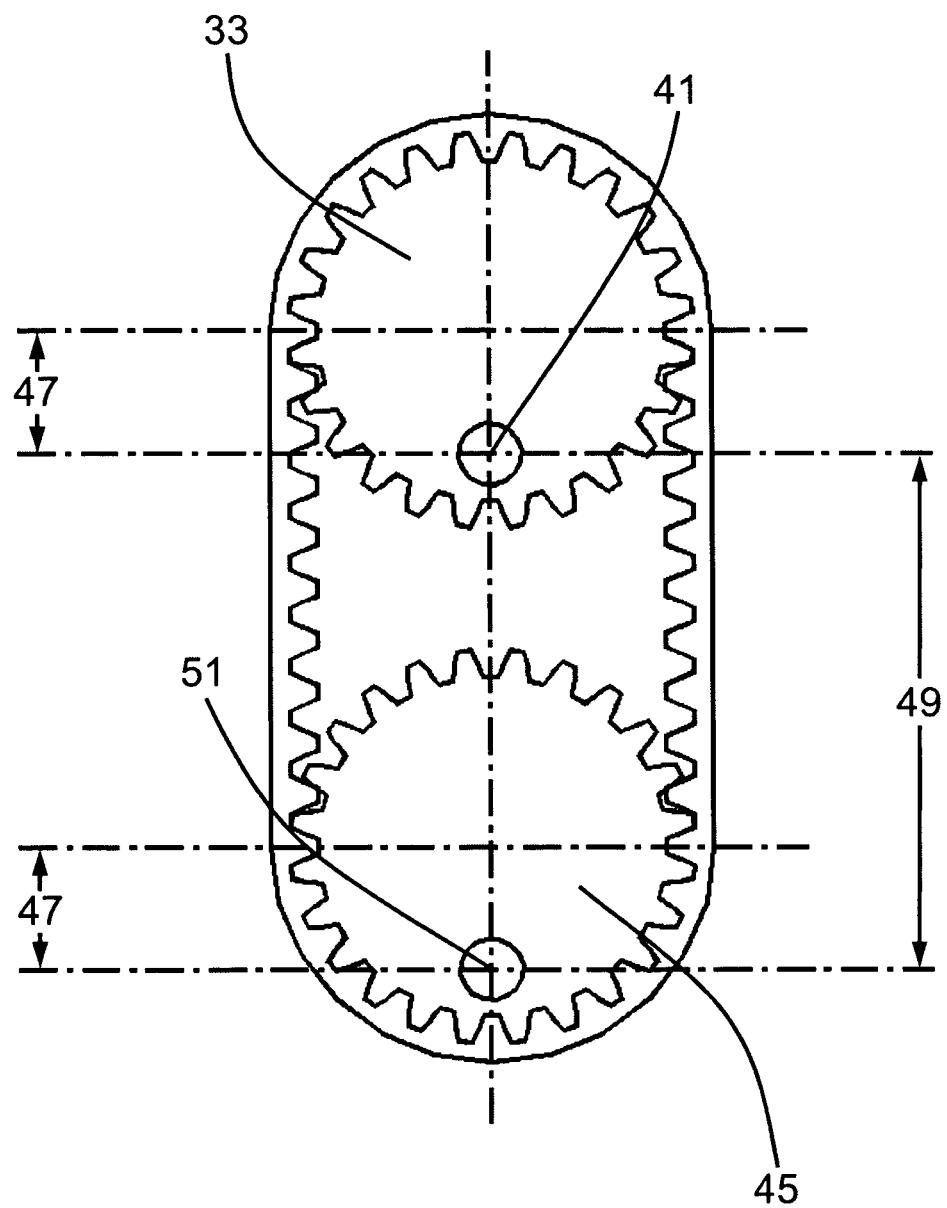
FIG. 13 shows an end view of one set of masses identifying the offset produced with the off-center sprocket mounting.

Referring to FIGS. 7A through 7D, the rotatable masses 33 are shown. Sprockets on the arm assembly 45 create the needed offset. Timing belts or timing chains 63, connect the arm assembly sprockets 45 with the rotatable masses 33 and serve to hold the outward centrifugal force created from the rotational motion of the rotatable masses in a circular path around the arm assembly sprockets 45. The input 29 and output 31 ends are concentric along a longitudinal rotational axis of the crankshaft 45. The offset 47 is created by mounting the sprockets 45 off-center, as shown in FIG. 13. The off-center distance 47 is the same on the arm assembly sprocket 45 as on the rotatable mass sprocket 33.

In the previous invention, the rotatable masses 33 are coupled to the crankshaft 45 using bearings. In this improvement, the preferred embodiment has the rotatable masses 33 attached to the arm assembly 45 using timing belts or timing chains 63. The arm assembly sprockets 45 are attached directly to the arm assembly shaft 43. The rotatable masses 33 are attached to the drive link 59 by way of a bearing 41. The timing belts or timing chains 63 carry the centrifugal load. Therefore the bearing 41 only carries the much smaller pulling load from the drive link 59. Since bearings subjected to a centrifugal load create a high rolling friction, this improvement allows a higher load-carrying capacity and reduced size of transmission for a given load capacity. A further enhancement is the use of elliptical sprockets for both the arm assembly and mass sprockets. The elliptical sprockets reduce the initial mass moment of inertia of the system, increasing the performance or power capacity of the system.

Figure 22A:
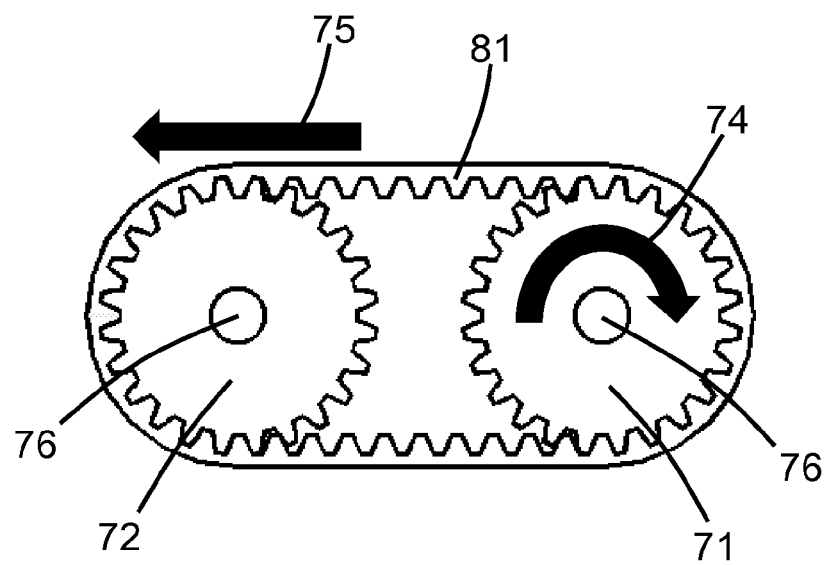
FIG. 22a shows an annotated sprocket and belt configuration for a classic use of sprockets and belts. The figure shows rotation of 1 sprocket causing tension on one side of the belt.
Figure 22B:
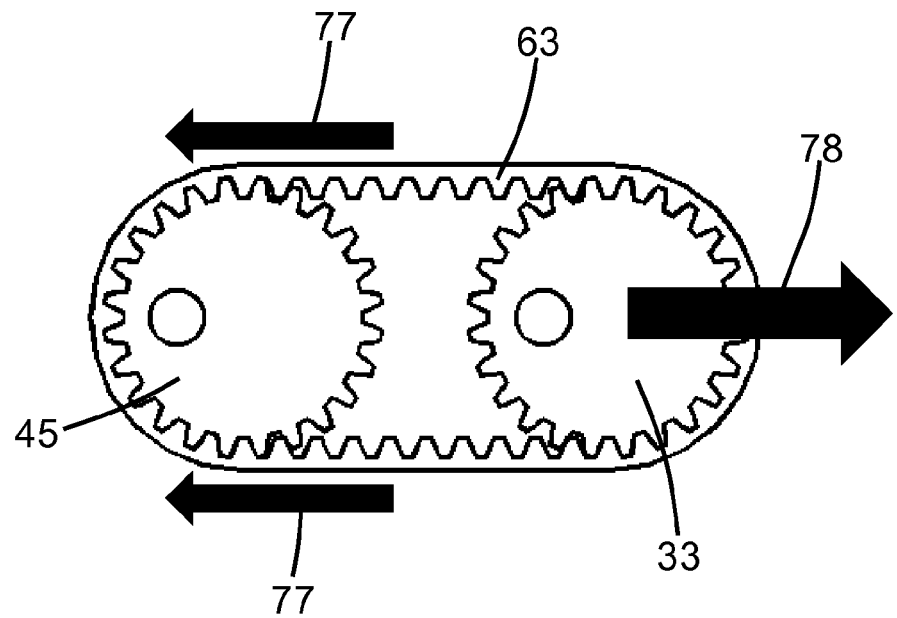
FIG. 22b shows the mass sprockets of the current invention with forces and belt tension annotated. The figure shows force from the rotating mass acting on both sides of the belt.

FIG. 22a shows a classic use of timing belts or timing chains and sprockets where the sprockets are mounted to a shaft through the sprocket centers 76 and torque is transferred from one sprocket 71 to the other sprocket 72. Sprocket 71 rotates due to torque 74 and causes reaction force 75 to act on the belt putting one side of the timing belt 81 in tension. The reaction force 75 causes the rotation of sprocket 72. FIG. 22b shows the use of sprockets and timing belts or timing chains in the present invention where the centrifugal force 78 of the rotatable mass sprocket 33 is transferred to arm assembly sprocket 45 by timing belt 63. Rotatable mass sprocket 33 is pulled in direction shown causing a centrifugal force 78 acting in the direction shown, placing tension on both sides of timing belt 63 by reaction forces 77 as shown.

As shown in FIGS. 8A, 8B, 9A and 9B, a drive link 59 and drivebar 65 connects the input shaft 29 to the masses 33 by way of a drive yoke 53 and extension 57 so that when the input shaft 29 rotates, the masses 33 rotate about the offset sprockets 35.

Figure 15:
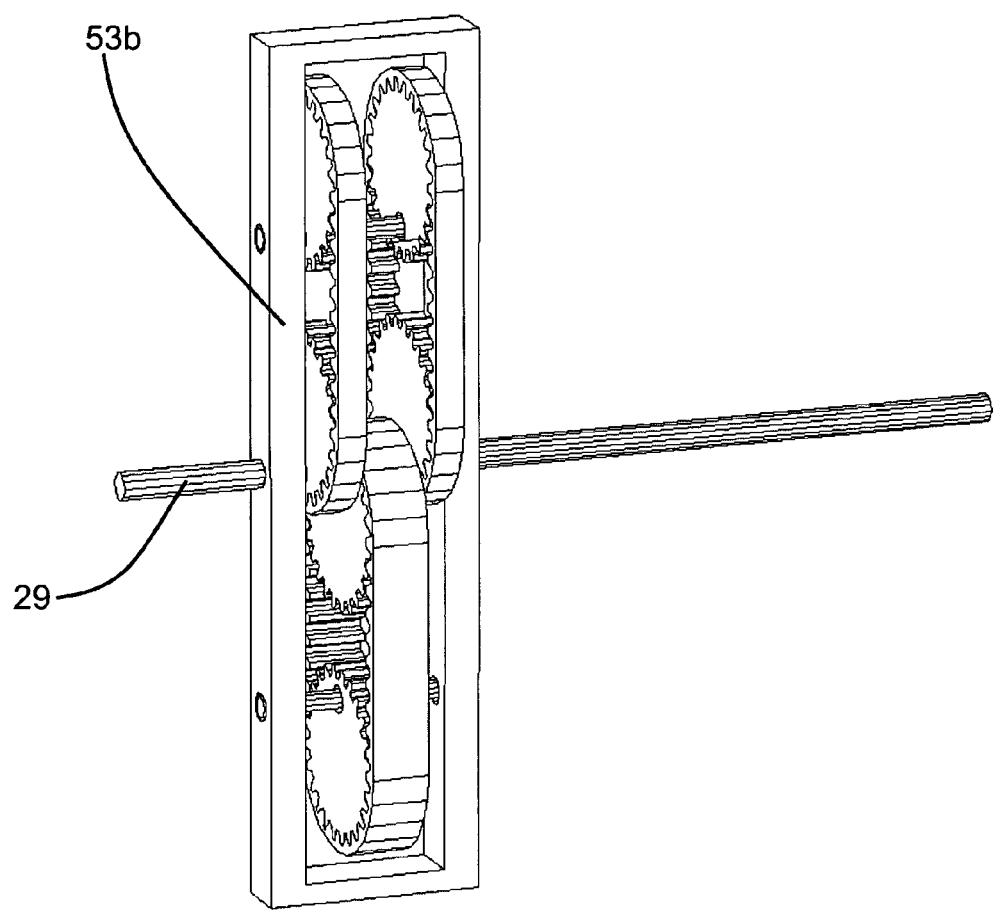
FIG. 15 shows an alternate carriage structure for the input drive which replaces the drive yoke.
Figure 16:
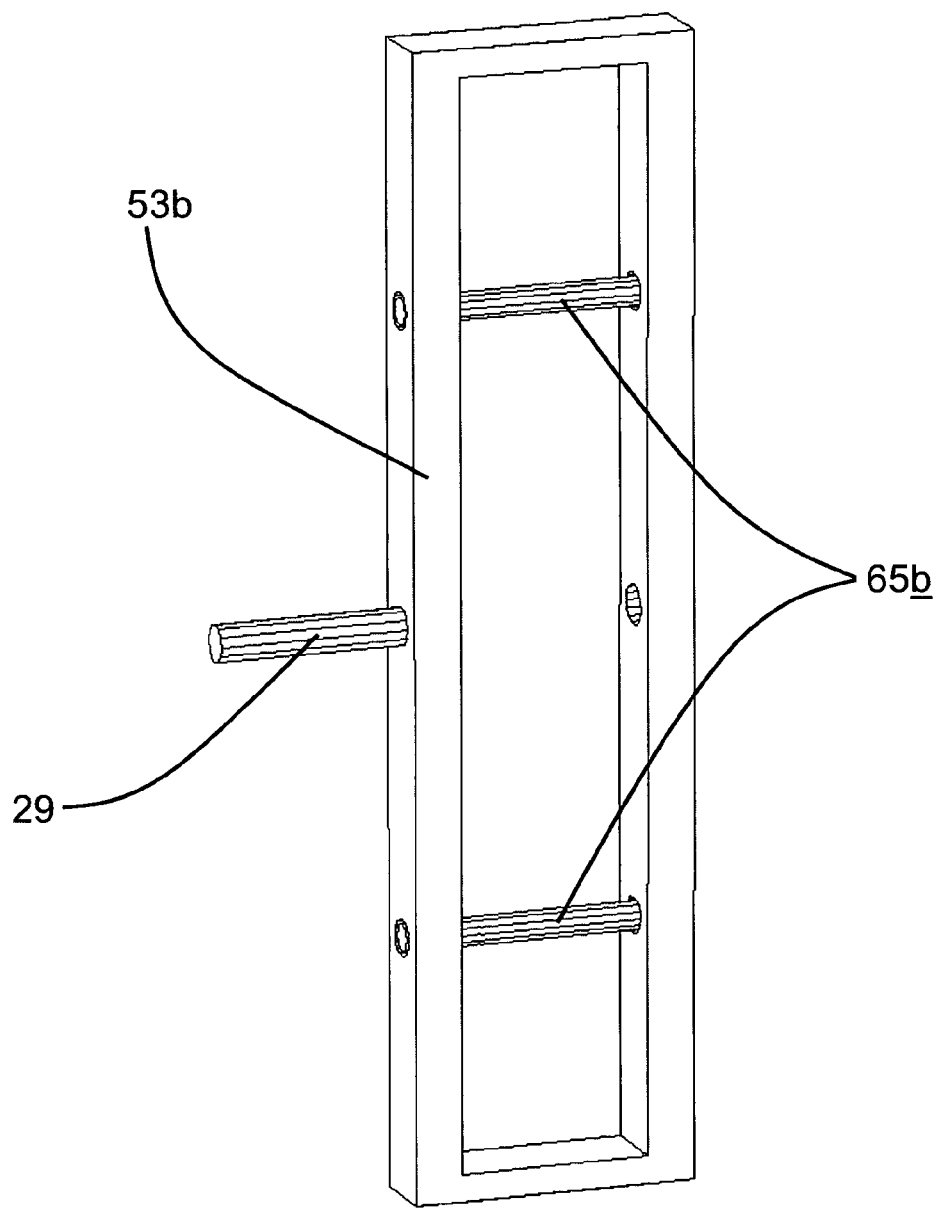
FIG. 16 shows a cutaway of the alternate input assembly with the masses removed for clarity.
Figure 17:
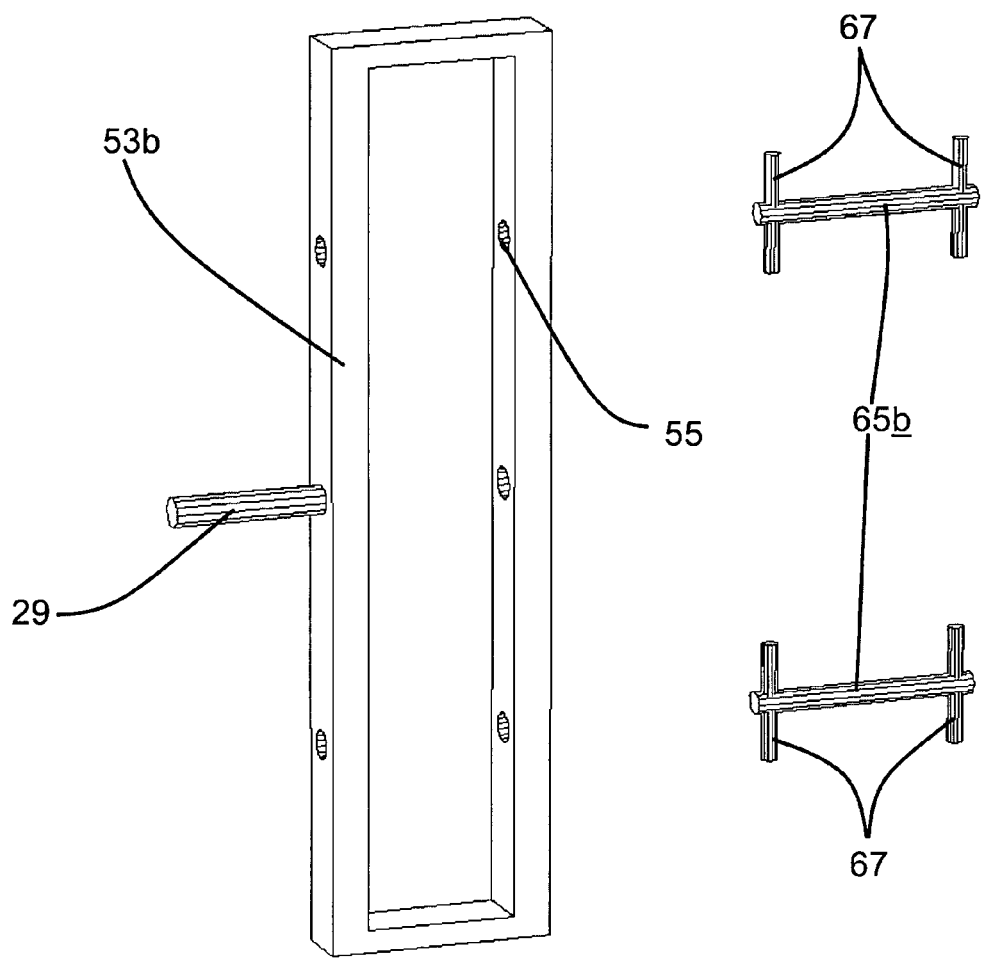
FIG. 17 shows an exploded view of the alternate input assembly with the floating drive bars shown.
Figure 18:
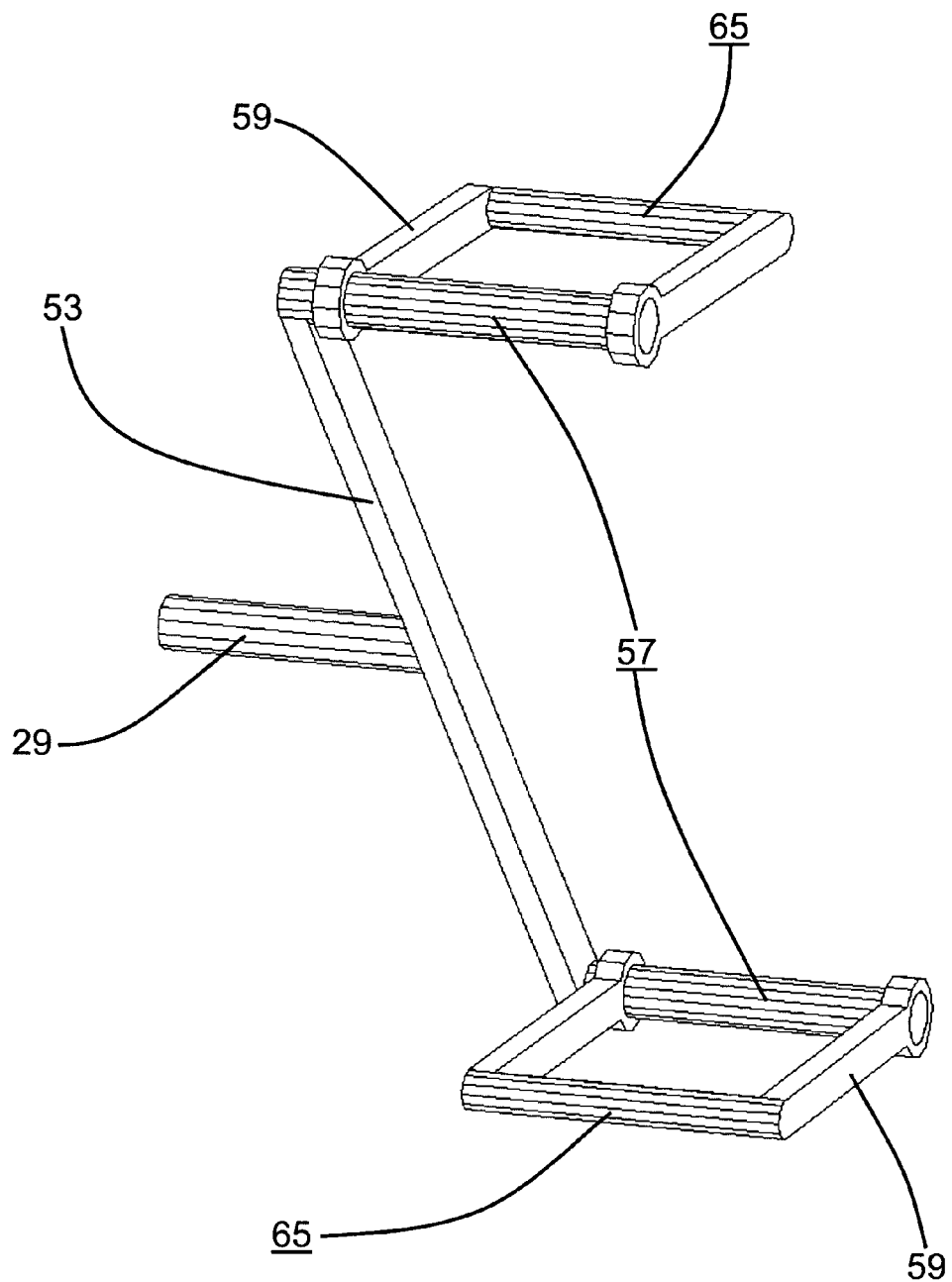
FIG. 18 presents an alternate view of the input yoke and drive links.

An alternate method of input drive is shown in FIGS. 15, 16, and 17. The input drive assembly 53b is a drive box that replaces the drive yolk 53, [see FIG. 18]. This configuration of input drive is a more compact design. The shape of the drive box 53b is shown as a simple rectangle for ease of presentation. The shape or geometry of the drive box could be a cylinder such as in a torque tube, or some other shape. Components of the drive box typically include, a plate on each end and a coupling component between the plates.

Referring to FIGS. 16 and 17, the drive bars 65b are mounted in a slightly elongated slot 55. Alignment bars 67 can be spring loaded to create tension on the drive bars and thus tension on the timing belts or chains 63 when the transmission is not rotating. This creates a more compact design and allows the springs to preload the timing belts or chains 63 so that the teeth on the sprockets 33, 45 maintain position on the timing belts when the transmission is not spinning. This spring loading also allows for less precise manufacturing tolerances and a simplified design.

FIGS. 12A through 12F show an end view of rotatable masses 33 depicting the rotation during six different angles of a single rotational cycle. This view shows that the orientation of the sprockets is constant throughout the rotational cycle.

Both input drive systems allow the input rotation to apply a load to the rotatable masses 33 normal to the centrifugal force. The drive linkage 59 transfers torque from the power source to the rotatable masses 33 without applying a load or force in the direction of the centrifugal loads. By applying the drive force in a direction normal to the rotational direction, the velocity to which the rotatable masses 33 rotate about the shaft 29 is the same as the input velocity and remains constant throughout the rotational cycle. This configuration eliminates angular acceleration loads in the previous linkage configuration which result in feedback torque. This enables the offset of the sprockets 35 on the shaft 43 to be increased, resulting in a higher load capacity in a smaller package.

The yoke 53 can either push or pull the masses 33. In the example described above with respect to FIGS. 12A through 12F, the yoke 53 pulls the masses 33, such that the links 59 are in tension. The links 59 can be rigid members or flexible members. Alternatively, the yoke 53 could push the masses 33 with the links 59 being in compression.

Large variation in speed output can be accomplished with the transmission. The previous invention discloses a method of speed control by changing the phase angle between two sets of masses. This method of control is still a valid method for the timing belt embodiment. The present invention provides alternate methods of speed control by changing the mass moment of inertia of the arm assembly 35. Altering the mass-moment of inertia of the arm assembly 35 changes the duration of the drive and free-wheel portions of the cyclic process. Changing the mass moment of inertia of the arm assembly 35 changes the time durations for the various events in the cyclic process. This variation in the duration of the drive portion of the cyclic process controls the output braking torque (average torque) of the transmission.

Figure 14:
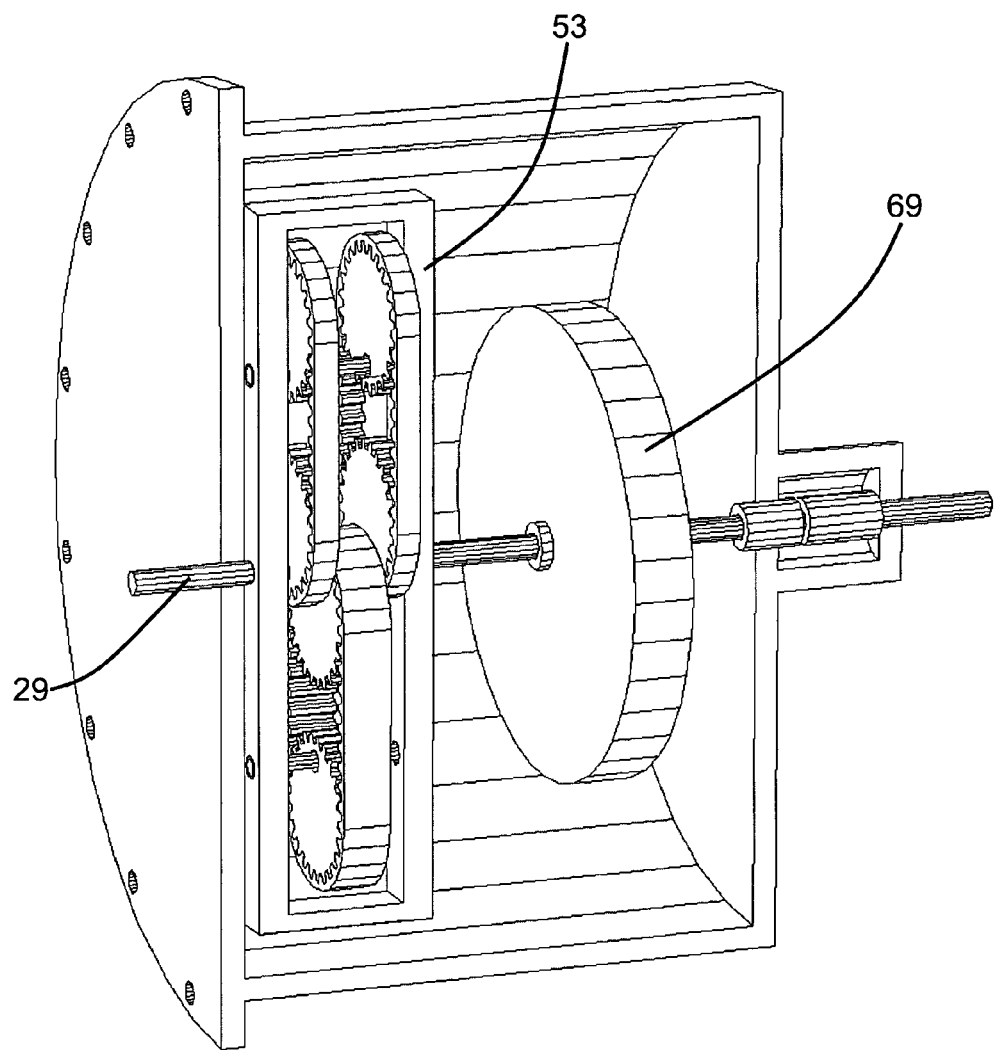
FIG. 14 shows a cutaway of an assembled transmission with a modified drive assembly (yoke) and with the addition of an inertia control system.

FIG. 14 shows a cutaway of an assembled transmission with the alternate input assembly 53 and a black box inertia control device 69. The inertia control device 69 as described above adds or subtracts inertia from the arm assembly 35, causing a variation in the output of the transmission by altering the duration of the drive portion of the cyclic process. Various methods of inertia control are possible including using flywheels that are able to freewheel or be fixed to the shaft 43. There is a wide variety of commercial clutches available for this function; hence, they are not shown. Other methods of controlling the inertia of the arm assembly 35 include magnetorhealogical fluid, electrorhealogical fluid, and mechanical devices such as used on engine governors and the like.

Figure 19:
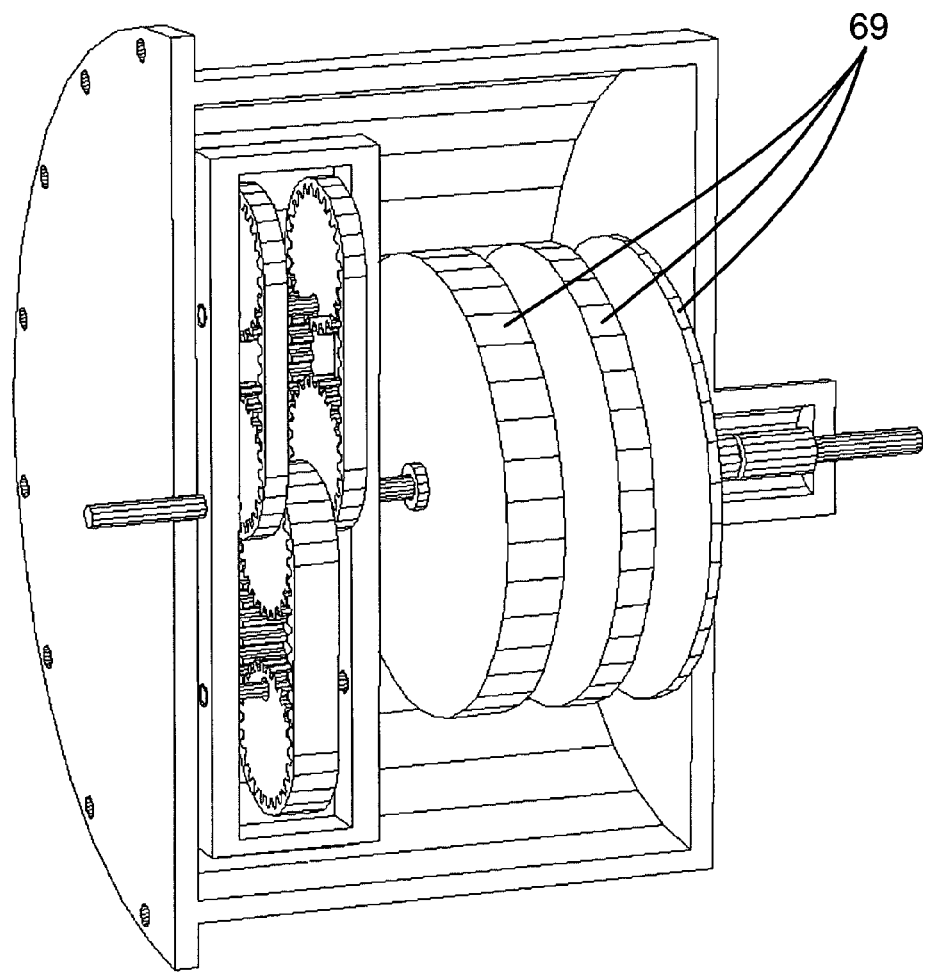
FIG. 19 shows an alternate inertia control method where multiple inertia control devices such as flywheels or clutches are used to control the output torque.
Figure 20:
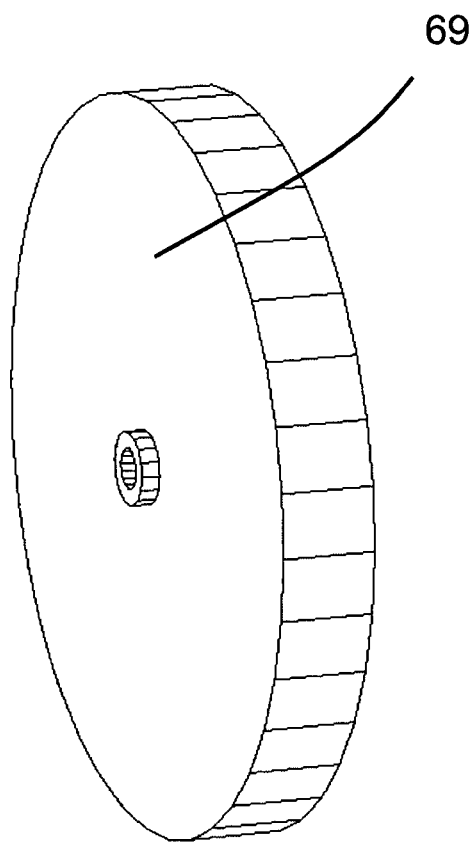
FIG. 20 shows a single inertia control device that could be any of the several device types described.
Figure 21:
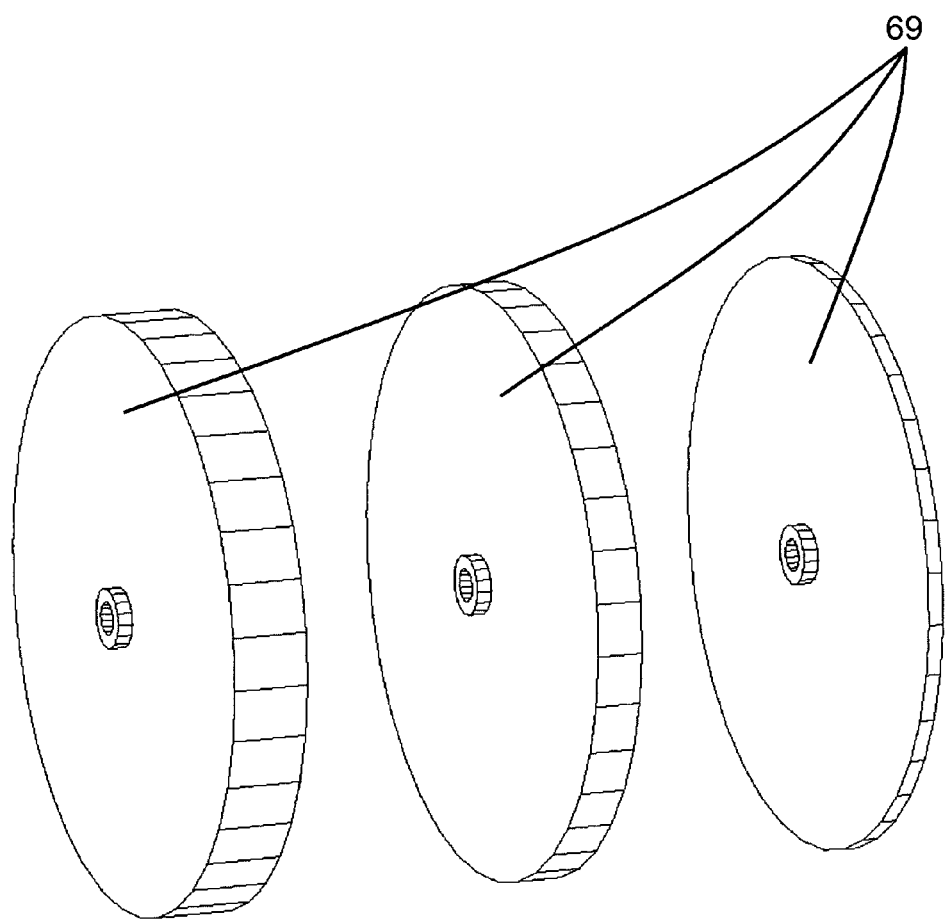
FIG. 21 shows multiple inertia control devices that could be any of the several device types described.

FIG. 19 shows an inertia control system that uses multiple fixed masses 69 which can be connected and disconnected from the arm assembly 35. Each of the masses 69 creates a different inertia. With n number masses 69, $2^n$ represents the number of unique speed outputs that can be obtained.

The transmission of the present invention can be made in a very compact size. The transmission can be scaled to suit the particular application. More torque would require larger masses 33. The transmission could be used on a variety of vehicles from high performance racing cars to automobiles, trucks, and children's play toys. In addition, the transmission can also be used in non-vehicular applications.

The foregoing disclosure and representations made in the drawings are merely illustrative of the principles of this invention and are not to be interpreted in a limiting sense.

The invention claimed is:

1. A transmission, comprising:
   a) a rotatable input member, which is rotated by a rotational power source;
   b) one or more rotatable masses, where said rotatable masses are sprockets;
   c) a shaft member with an eccentrically offset sprocket for each said rotatable mass, where said shaft member rotatably coupled to a casing, where said rotatable masses are rotatably coupled to said eccentrically offset sprockets by timing belts or timing chains where the centrifugal load of said rotatable masses are held by said timing belts or timing chains;
   d) said rotatable input member coupled to said rotatable masses by one or more linkages so that rotation of the input member causes said rotatable masses to rotate about said eccentric offset sprockets and said timing belts or said timing chains transfers said centrifugal loads of said rotatable masses to said eccentrically offset sprockets which generates an oscillating torque to said shaft member;

e) first and second one-way clutches to convert the said oscillating torque to unidirectional torque are coupled between said casing, said shaft member and an output member, said first one-way clutch and said shaft member drive said output member in the output direction when said shaft member is rotating in the output direction, said second one-way clutch and said casing prevents said shaft member from rotating in the other direction.

* * * * *